United States Patent
Kim et al.

(10) Patent No.: US 8,024,191 B2
(45) Date of Patent: Sep. 20, 2011

(54) SYSTEM AND METHOD OF WORD LATTICE AUGMENTATION USING A PRE/POST VOCALIC CONSONANT DISTINCTION

(75) Inventors: Yeon-Jun Kim, Whippany, NJ (US);
Alistair Conkie, Morristown, NJ (US);
Andrej Ljolje, Morris Plains, NJ (US);
Ann K. Syrdal, Morristown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 989 days.

(21) Appl. No.: 11/930,999

(22) Filed: Oct. 31, 2007

(65) Prior Publication Data
US 2009/0112591 A1    Apr. 30, 2009

(51) Int. Cl.
*G10L 15/04* (2006.01)
(52) U.S. Cl. ........................................... 704/254
(58) Field of Classification Search .................... 704/254
See application file for complete search history.

(56) References Cited

U.S. PATENT DOCUMENTS

| | | | | |
|---|---|---|---|---|
| 5,133,012 A | * | 7/1992 | Nitta | 704/251 |
| 5,799,276 A | * | 8/1998 | Komissarchik et al. | 704/251 |
| 6,502,073 B1 | * | 12/2002 | Guan et al. | 704/255 |
| 7,146,319 B2 | * | 12/2006 | Hunt | 704/254 |
| 7,337,116 B2 | * | 2/2008 | Charlesworth et al. | 704/254 |
| 7,856,351 B2 | * | 12/2010 | Yaman et al. | 704/9 |

* cited by examiner

Primary Examiner — Susan McFadden

(57) ABSTRACT

Systems and methods are provided for recognizing speech in a spoken dialogue system. The method includes receiving input speech having a pre-vocalic consonant or a post-vocalic consonant, generating at least one output lattice that calculates a first score by comparing the input speech to a training model to provide a result and distinguishing between the pre-vocalic consonant and the post-vocalic consonant in the input speech. A second score is calculated by measuring a similarity between the pre-vocalic consonant or the post vocalic consonant in the input speech and the first score. At least one category is determined for the pre-vocalic match or mismatch or the post-vocalic match or mismatch by using the second score and the results of the an automated speech recognition (ASR) system are refined by using the at least one category for the pre-vocalic match or mismatch or the post-vocalic match or mismatch.

21 Claims, 3 Drawing Sheets

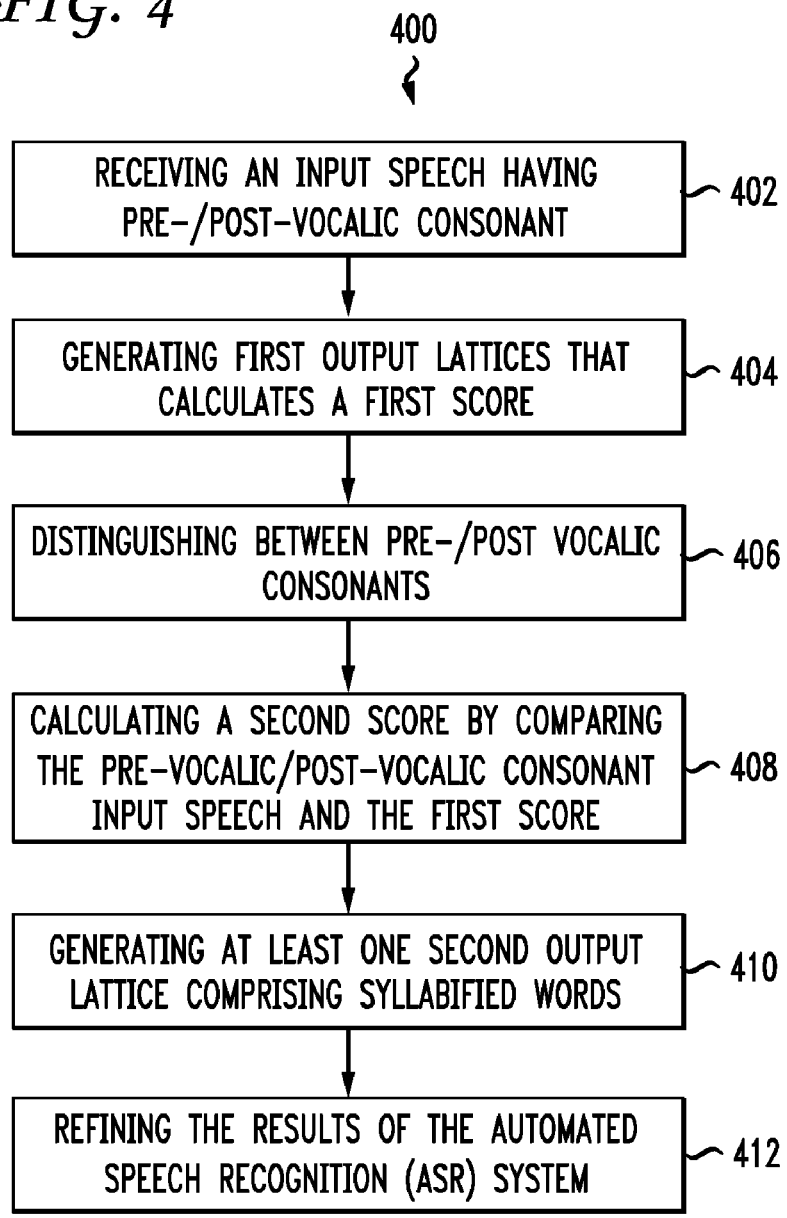

SYSTEM AND METHOD OF WORD LATTICE AUGMENTATION USING A PRE/POST VOCALIC CONSONANT DISTINCTION

BACKGROUND OF THE INVENTION

1. Field of the Invention

This invention relates to speech recognition systems in general and, more particularly, to a method and a system for exploiting the differences between pre-vocalic and post-vocalic consonants.

2. Introduction

Spoken dialog systems include several different modules that are used for speech processing. For example, FIG. 1 shows a basic dialog system including an automatic speech recognition (ASR) module 102, a spoken language understanding (SLU) module 104, a dialog management module (DM) 106, a spoken language generation (SLG) module 108 and a speech generation module or text-to-speech (TTS) module 110. These modules will process an input utterance from a user, seek to understand it meaning, and generate a response which is then audibly heard by the user. These systems seek to utilize much information within the audible signal generated by the user, but may not take advantage of every possible piece of information that may be glean from such input utterance.

Accordingly, there is a need in the art to utilize further information that may be gleaned both from an user input utterance as well as an understanding of differences in particular pieces of language that may be utilized when generating a synthetic response.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention comprises systems, methods and computer readable media that recognizes speech in a spoken dialogue system. The method embodiment includes receiving an input speech having at least one pre-vocalic consonant or at least one post-vocalic consonant, generating at least one output lattice that calculates a first score by comparing the input speech to a training model to provide a result. The at least one output lattices may comprise syllabified words. The system also distinguishes between the at least one pre-vocalic consonant and the at least one post-vocalic consonant in the input speech, calculates a second score by measuring a similarity between the at least one pre-vocalic consonant or the at least one post vocalic consonant in the input speech and the first score. The system further generates at least one category for at least one pre-vocalic match or mismatch or at least one post-vocalic match or mismatch by using the second score. The system refines the results of an automated speech recognition (ASR) system by using the at least one category for at least one pre-vocalic match or mismatch or at least one post-vocalic match or mismatch.

This provides an improvement by adding supplementary knowledge to the ASR system without having to change the existing models, dictionaries, and other component of the ASR system.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 4 illustrates an exemplary method embodiment;

DETAILED DESCRIPTION

Figure 1:
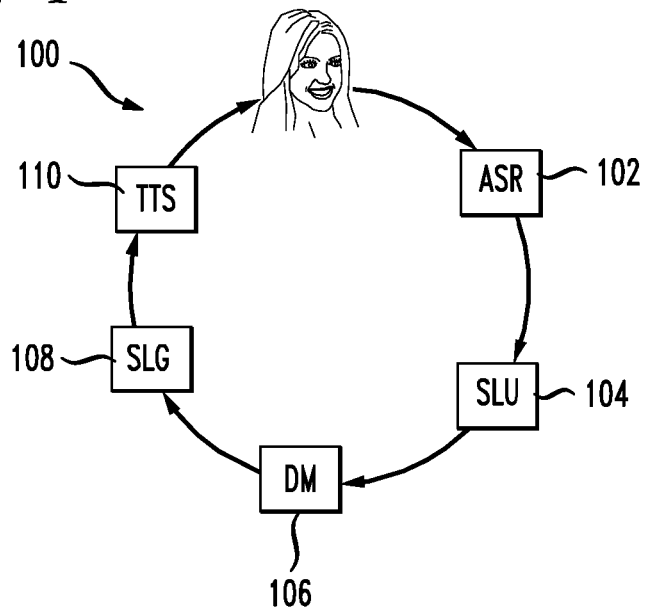
FIG. 1 illustrates an spoken dialog systems embodiment.

Spoken dialog systems aim to identify intents of humans, expressed in natural language, and take actions accordingly, to satisfy their requests. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110. The TTS module may be any type of speech output module. For example, it may be a module wherein one of a plurality of prerecorded speech segments is selected and played to a user. Thus, the TTS module represents any type of speech output. The present invention focuses on innovations related to the dialog management module 106 and may also relate to other components of the dialog system.

ASR module 102 may analyze speech input and may provide a transcription of the speech input as output. SLU module 104 may receive the transcribed input and may use a natural language understanding model to analyze the group of words that are included in the transcribed input to derive a meaning from the input. The role of DM module 106 is to interact in a natural way and help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

Figure 2:
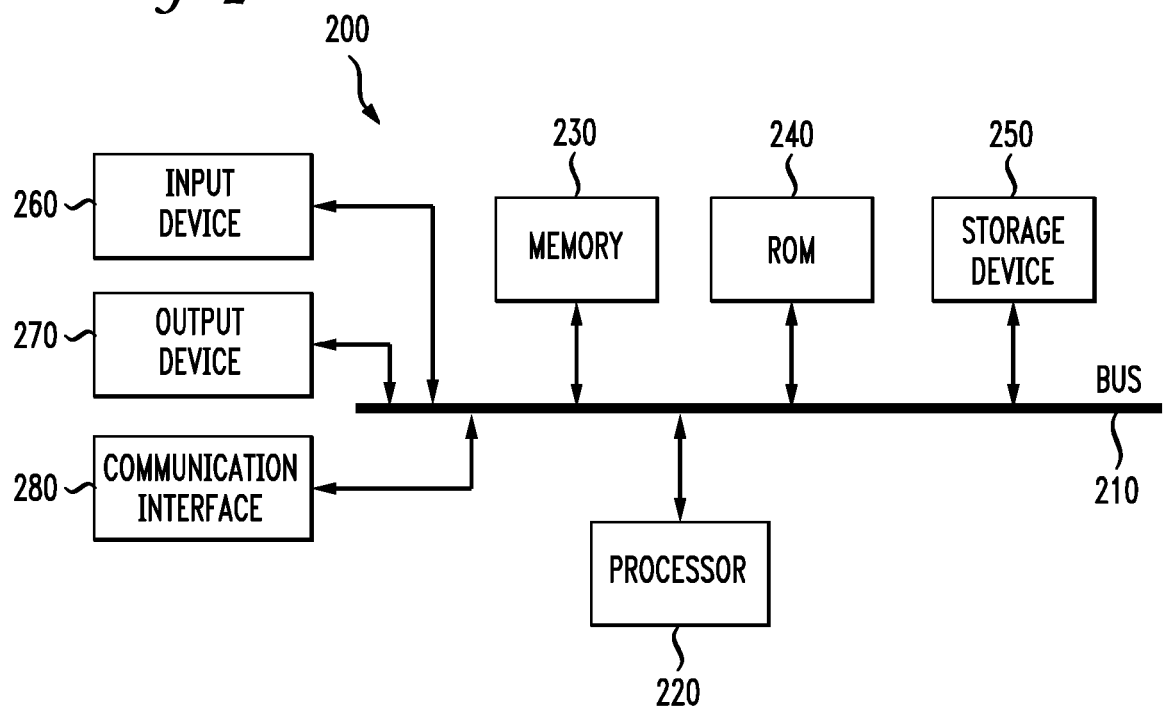
FIG. 2 illustrates a first example system embodiment.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. Where the inventions disclosed herein relate to the TTS voice, the output device may include a speaker that generates the audible sound representing the computer-synthesized speech.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, motion input, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200. System 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Figure 3:
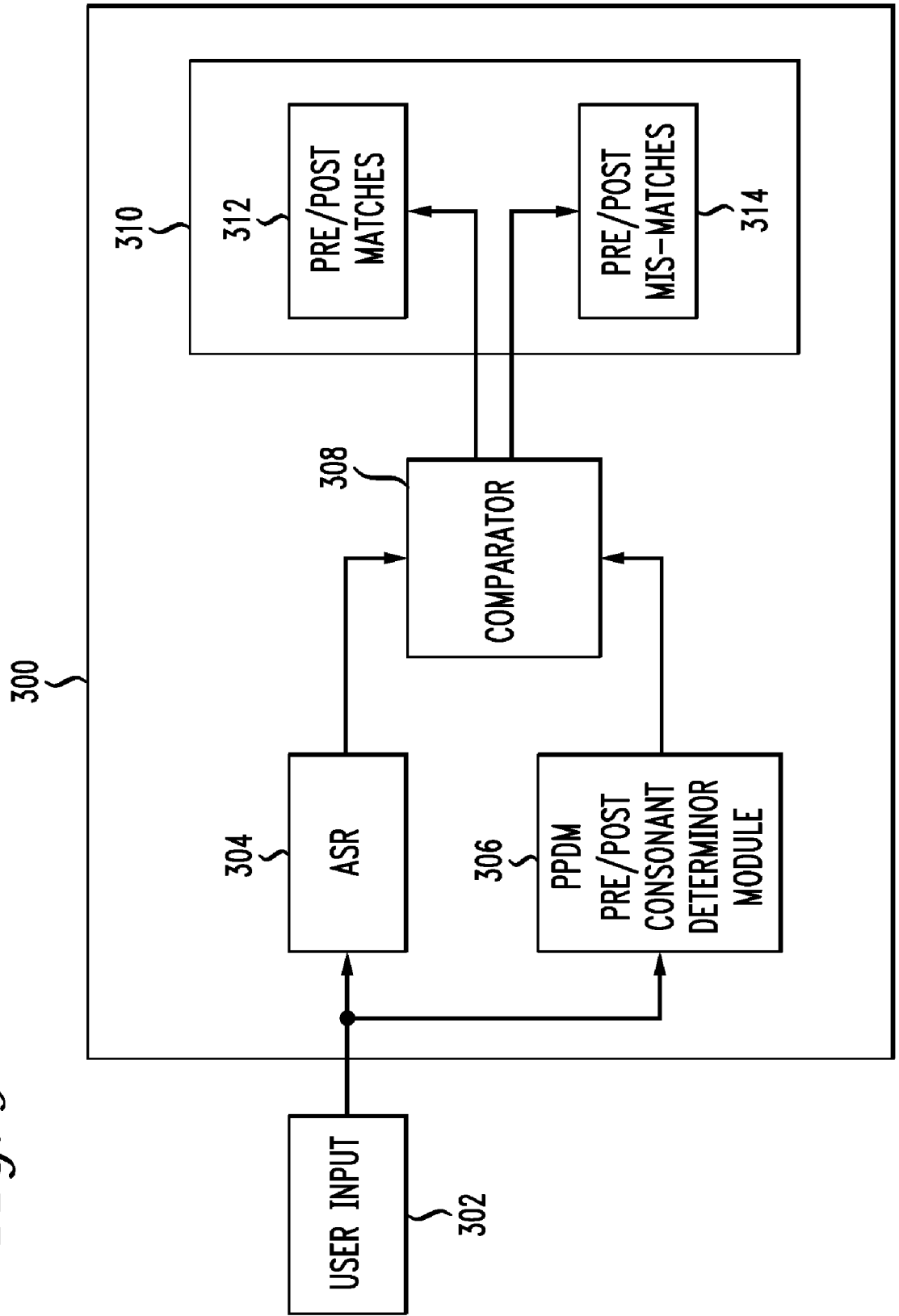
FIG. 3 illustrates a second example system embodiment.

FIG. 3 illustrates a system 300 for recognizing speech comprises a user speech input 302, an automatic speech recognizer (ASR) 304, a pre/post vocalic determine module (PPDM) 306, a comparator 308, and a categorizer 310, having a pre/post vocalic match category 312, and a pre/post vocalic mismatch category 314.

The system 300 receives the user speech input 302 and communicates the user speech signal 302 into the ASR module 304. The ASR module 304 may output a first lattice that ranks the competing outputs based on their score. The score is associated with a calculated similarity between the user's speech input 302 and the ASR 304 training model. The result of this comparison is referred to as a goodness score. The lattices may contain both words and phoneme output.

Another embodiment of the system is a pre-vocalic/post-vocalic determination module (PPDM) 306. The PPDM 306 receives the user speech input 302 and discriminates for each pre-vocalic consonant position and for each post-vocalic consonant position in the user's speech input. The PPDM 306 generates a second output lattice that may be syllabified for each of the pre-vocalic and post-vocalic consonants. In order to discriminate, the PPDM 306 may use any of the follow modeling techniques, but not limited: hidden Markov models (HMMs), support Vector machines (SVMs), and Neural networks (NNs).

The comparator 308 evaluates the scores from the first output lattice and the second output lattice to determine whether there are any pre/post-vocalic matches or pre/post-vocalic mismatches. For example, if the comparator 308 determines that the consonants scores form the first output lattices results are pre-vocalic, and the comparator also determines that the consonant scores from the second syllabified output lattices results are pre-vocalic, then a match is determined. When the system determines that there is a pre-vocalic or post-vocalic match, the word score is increased. Conversely, when the system determines the there is a pre/post-vocalic mismatch the word score is proportionally decreased. The system 300 uses the best modified score as the new corrected best recognition output.

The method embodiment of the invention is illustrated in FIG. 4. As shown in this figure, the method includes receiving input speech having at least one pre-vocalic consonant or at least one post-vocalic consonant (402), generating at least one output lattice that calculates a first score by comparing the input speech to a training model to provide a result (404), distinguishing between the at least one pre-vocalic consonant and the at least one post-vocalic consonant in the input speech (406), calculating a second score by measuring a similarity between the at least one pre-vocalic consonant and the at least one post-vocalic consonant in the input speech and the first score (408), determining at least one category for at least on pre-vocalic match or mis-match or at least one post-vocalic match or mis-match by using the second score (410), and refining the results of an automatic speech recognition (ASR) system using the at least one category for at least one pre-vocalic match or mis-match and at least one post-vocalic match or mis-match (412).

In one aspect, if there is a match between the second output lattice and the second score, a word probability may be increased. It is preferable that the at least one output lattice comprises at least syllabified words. Further, if there is a mismatch between the second output lattice and the second score, the word probability may be decreased. The training model might distinguish between the at least one pre-vocalic consonant and the at least one post-vocalic consonant by using Hidden Markov models (HMMs), support vector machines (SVMs) and neuro-networks (NNs).

As has been noted above, the method aspect of the invention may be also implemented as a system for recognizing speech. The system may comprise various modules that are configured to perform the particular functionality of the method. The modules may comprise a combination of a hard drive storing computer-readable instructions for controlling a computing device and the various hardware components of the computing device that are then utilized to carry out the particular functions. One of skill in the art would understand how to configure such a module and the appropriate programming languages and appropriate hardware components that are then combined and directed by the instructions to carry out the functionality of the method.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

The invention claimed is:

1. The method for recognizing speech, the method comprising:

receiving, via a processor, an input speech having at least one pre-vocalic consonant or at least one post-vocalic consonant;

generating at least one output lattice that calculates a first score by comparing the input speech to a training model to provide a result;

distinguishing between the at least one pre-vocalic consonant and the at least one post-vocalic consonant in the input speech;

calculating a second score by measuring a similarity between the at least one pre-vocalic consonant or the at least one post-vocalic consonant in the input speech and the first score;

determining at least one category for at least one pre-vocalic match or mismatch or at least one post-vocalic match or mismatch by using the second score; and refining the results of the an automated speech recognition system by using the at least one category for at least one pre-vocalic match or mismatch or at least one post-vocalic match or mismatch.

2. The method of claim 1, wherein if there is a match between the second output lattice and the second score, a word probability is increased.

3. The method of claim 1, wherein at least one output lattice comprises syllabified words.

4. The method of claim 1, wherein if there is a mismatch between the second output lattice and the second score, a word probability is decreased.

5. The method of claim 1, wherein a goodness score is determined by calculating the similarity between the input speech and the training model.

6. The method of claim 1, wherein the automated speech recognition system is trained to distinguish each of the pre-vocalic consonants and the post-vocalic consonants.

7. The method of claim 1, wherein the training model distinguishes between the at least one pre-vocalic consonant and the at least one post-vocalic consonant can be accomplished by using hidden Markov models, support vector machines and neural networks.

8. A system for recognizing speech, the system comprising:

a first module configured, via a processor, to receive an input speech having at least one pre-vocalic consonant or at least one post-vocalic consonant;

a second module configured to generate at least one output lattice that calculates a first score by comparing the input speech to a training model to provide a result;

a third module configured to distinguish between the at least one pre-vocalic consonant and the at least one post-vocalic consonant in the input speech;

a fourth module configured to calculate a second score by measuring a similarity between the at least one pre-vocalic consonant or the at least one post vocalic consonant in the input speech and the first score;

a fifth module configured to determine at least one category for at least one pre-vocalic match or mismatch or at least one post-vocalic match or mismatch by using the second score; and a sixth module configured to refine the results of the an automated speech recognition system by using the at least one category for at least one pre-vocalic match or mismatch or at least one post-vocalic match or mismatch.

9. The system of claim 8, wherein if there is a match between the second output lattice and the second score, a word probability is increased.

10. The system of claim 8, wherein at least one output lattice comprises syllabified words.

11. The system of claim 8, wherein if there is a mismatch between the second output lattice and the second score, a word probability is decreased.

12. The system of claim 8, wherein a goodness score is determined by calculating the similarity between the input speech and the training model.

13. The system of claim 8, wherein the automated speech recognition system is trained to distinguish each of the pre-vocalic consonants and the post-vocalic consonants.

14. The system of claim 8, wherein the training model distinguishes between the at least one pre-vocalic consonant and the at least one post-vocalic consonant can be accomplished by using hidden Markov models, support vector machines and neural networks.

15. A non-transitory computer-readable medium storing instructions for controlling a computing device to process speech, the instructions comprising:

receiving, via a processor, an input speech having at least one pre-vocalic consonant or at least one post-vocalic consonant;

generating at least one output lattice that calculates a first score by comparing the input speech to a training model to provide a result;

distinguishing between the at least one pre-vocalic consonant and the at least one post-vocalic consonant in the input speech;

calculating a second score by measuring a similarity between the at least one pre-vocalic consonant or the at least one post-vocalic consonant in the input speech and the first score;

determining at least one category for at least one pre-vocalic match or mismatch or at least one post-vocalic match or mismatch by using the second score; and refining the results of the an automated speech recognition system by using the at least one category for at least one pre-vocalic match or mismatch or at least one post-vocalic match or mismatch.

16. The non-transitory computer-readable medium of claim 15, wherein if there is a match between the second output lattice and the second score, a word probability is increased.

17. The non-transitory computer-readable medium of claim 15, wherein at least one output lattice comprises syllabified words.

18. The non-transitory computer-readable medium of claim 15, wherein if there is a mismatch between the second output lattice and the second score, a word probability is decreased.

19. The non-transitory computer-readable medium of claim 15, wherein a goodness score is determined by calculating the similarity between the input speech and the training model.

20. The non-transitory computer-readable medium of claim 15, wherein the automated speech recognition system is trained to distinguish each of the pre-vocalic consonants and the post-vocalic consonants.

21. The non-transitory computer-readable medium of claim 15, wherein the training model distinguishes between the at least one pre-vocalic consonant and the at least one post-vocalic consonant can be accomplished by using hidden Markov models, support vector machines and neural networks.

* * * * *